No. 707,497. Patented Aug. 19, 1902.
E. G. BENNETT.
HAME FASTENER.
(Application filed Aug. 30, 1901.)
(No Model.) 2 Sheets—Sheet 1.
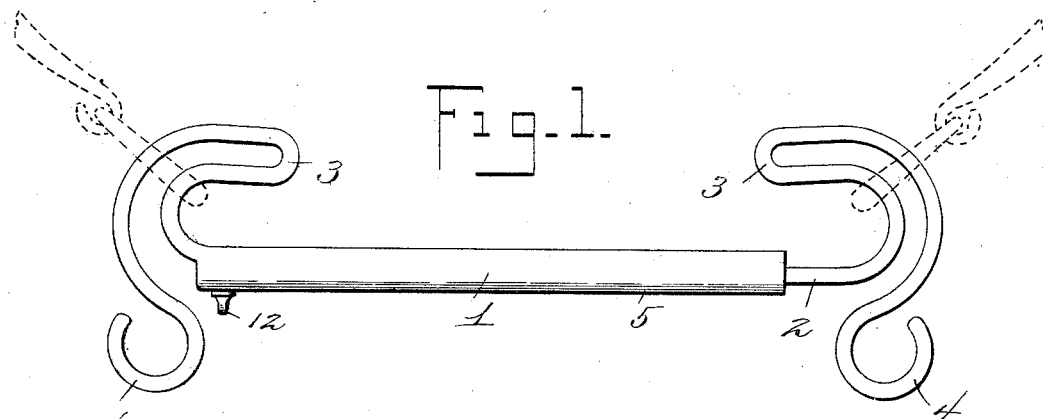
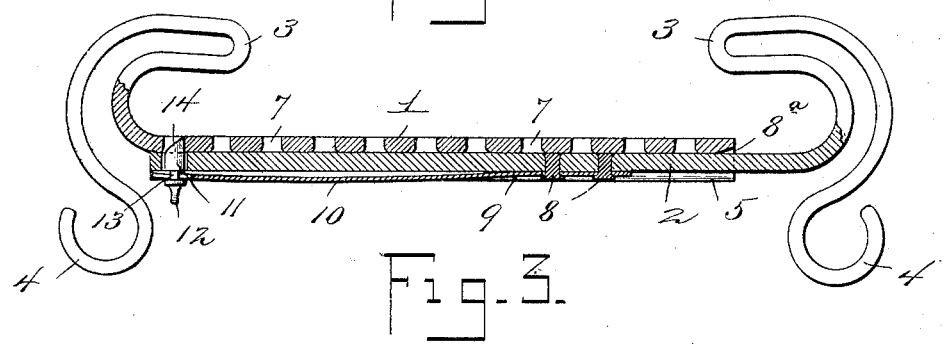
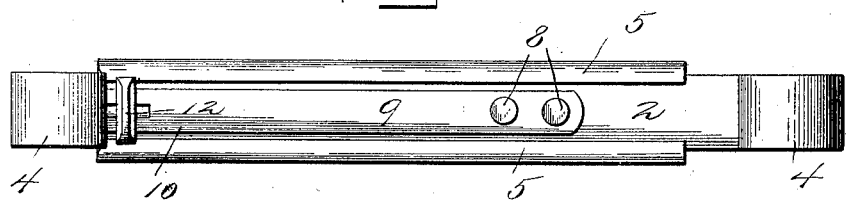
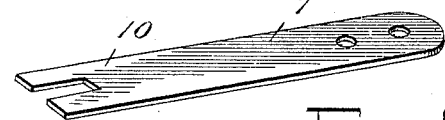
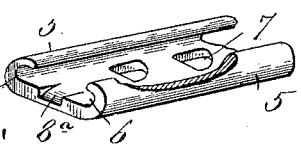
Witnesses
H. L. Amer.
W. Arthur Maddox
Inventor
Emmett G. Bennett.
By Victor J. Evans.
Attorney
THE NORRIS PETERS CO., PHOTO-LITHO., WASHINGTON, D. C.

No. 707,497. Patented Aug. 19, 1902.
E. G. BENNETT.
HAME FASTENER.
(Application filed Aug. 30, 1901.)
(No Model.) 2 Sheets—Sheet 2.
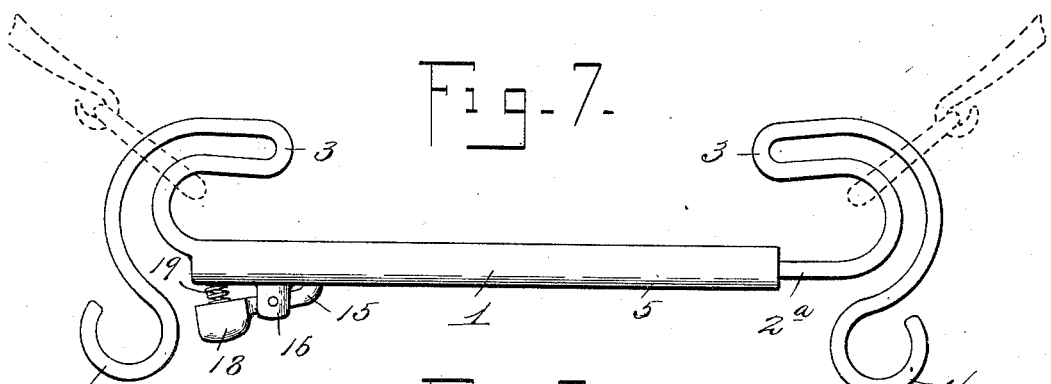
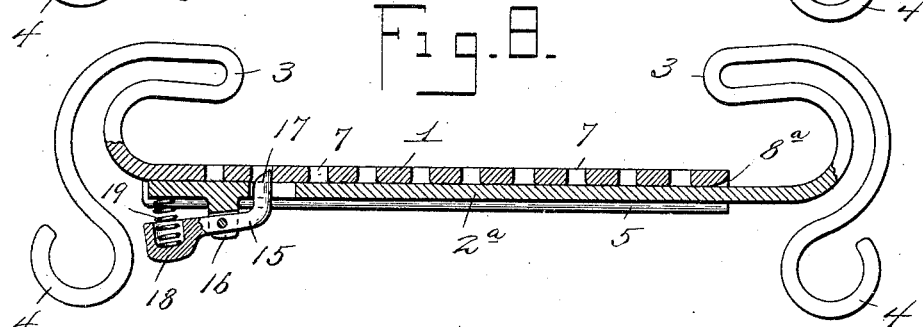
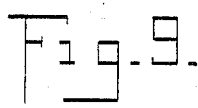
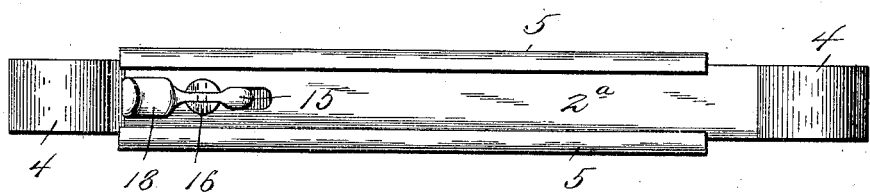
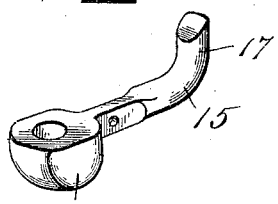
Witnesses
H. L. Amer.
W. Arthur Maddox.
Inventor
Emmett G. Bennett.
By Victor J. Evans
Attorney

UNITED STATES PATENT OFFICE.

EMMETT G. BENNETT, OF ATLANTA, GEORGIA.

HAME-FASTENER.

SPECIFICATION forming part of Letters Patent No. 707,497, dated August 19, 1902.

Application filed August 30, 1901. Serial No. 73,858. (No model.)

*To all whom it may concern:*

Be it known that I, EMMETT G. BENNETT, a citizen of the United States, residing at Atlanta, in the county of Fulton and State of Georgia, have invented new and useful Improvements in Hame-Fasteners, of which the following is a specification.

My invention relates to hame-fasteners, the object being to provide a simple inexpensive device for securing hames together which may be quickly and easily manipulated and will be efficient and reliable in use.

The invention comprises a pair of overlapping or telescopic plates, one formed with a series of perforations and the other provided with a spring-pressed catch or dog adapted to engage the perforated plate.

The invention also comprises certain details of construction, which will be fully described hereinafter in connection with the accompanying drawings, and particularly pointed out in the appended claims.

In the drawings, Figure 1 is a front elevation of a hame-fastener embodying the invention. Fig. 2 is a longitudinal section of the same. Fig. 3 is a bottom plan of the fastener. Fig. 4 is a detail perspective of the spring employed as a feature of the device. Fig. 5 is a detail sectional view showing the spring-controlled dog in perspective. Fig. 6 is a detail perspective view of one end of the perforated plate. Fig. 7 is a front elevation of a modified construction of the invention. Fig. 8 is a longitudinal section thereof. Fig. 9 is a bottom plan of the same, and Fig. 10 is a perspective view of the locking-dog employed.

Referring now to the first six figures of the drawings, which show the preferred embodiment of the invention, the numeral 1 designates the outer and 2 the inner plate of the fastener, each of said plates having its outer end bent inward and then outward and downward to form hooks 3 to engage the rings on the hame-straps, as shown by dotted lines in Fig. 1, and depending finger-pieces 4 to facilitate the manipulation of the plates.

The outer plate 1 has its longitudinal edges 5 bent inward, forming grooves 6, within which the inner plate 2 slides, and said outer plate is formed with a central row of semi-elliptical perforations 7 and with a bevel-lipped channel at inner end 8ª.

Secured to the under side of the inner plate 2 by one or more rivets 8 is a flat spring 9, the free end 10 of which is bifurcated to straddle a locking-dog 11 to rotatably or reversibly secure the same to the plate 2 and is formed with a head or thumb piece 12 and a reduced shank 13 and having its end 14 beveled on its front side to permit it to ride over the walls of the perforations, permitting said members to be moved toward each other, and the dog is flattened on its rear side to engage the square wall of one of the perforations 7, preventing the dog from accidentally turning to lock the members in their adjusted position, and when said dog is turned in the reverse direction, presenting its beveled end to the square walls of the perforations, the members are free to be moved in the opposite direction.

The modification shown in Figs. 7 to 10, inclusive, differs from the construction above described in the means for securing the plates together. In lieu of the flat spring 9 and dog 11 I employ a dog 15, pivotally secured between perforated ears 16, depending from the inner plate 2ª. One end 17 of this dog is bent to engage within the openings in the outer plate 1, and the opposite end is formed with a socket 18, within which is seated one end of a coil-spring 19, the opposite end of which is attached to the plate 2ª.

The utility and operation of the device will be readily understood. The dog 11 when turned by its finger-piece to present the beveled end 14 to the walls of the openings 7 permits the plates 1 and 2 to be adjusted telescopically. When the dog 11 is turned to present its vertical side to the walls of the openings 7, the plates are firmly secured together.

The dog 15, as is obvious, is held in engagement with the outer plate 1 by the tension of the spring and the weight of socket end 18, and the plates are released by tilting the lever upon its pivot.

I claim—

1. A hame-fastener comprising two telescopically-related plates each having an outer terminal hook device, the one plate being provided with a series of openings and the other plate having a revoluble spring-controlled dog slidingly mounted therein adjacent to one end, the dog having a clearance at its upper extremity to permit the one plate to slide thereover in varying the adjustment.

2. A hame-fastener comprising two plates with outer terminal hook devices, the one plate being superimposed on the other and both plates telescopically related, the one plate having a series of separated openings therethrough in longitudinal alinement, a dog revolubly and slidingly mounted in the other plate and normally projected through one of the openings of the first plate, said dog having a clearance structure at its upper extremity to permit the upper plate to slide thereover in varying the adjustment of the two plates, and a spring secured to the plate carrying the dog and having a bifurcated end in engagement with the latter.

3. A hame-fastener comprising an outer perforated plate having its edges bent inward to form grooves, and one of its ends bent inward, then outward, and downward to form a hook, to engage a ring, and a depending finger-piece, an inner plate adjustably supported in said grooves and formed with an opening, and having one of its ends bent inward, then outward and downward to form a hook to engage a ring, and a depending finger-piece, and a spring-pressed dog extending through said opening.

In testimony whereof I affix my signature in presence of two witnesses.

EMMETT G. BENNETT.

Witnesses:
B. F. FUNK,
GEORGE M. BOND.